United States Patent
Siegel et al.

(10) Patent No.: US 8,611,344 B2
(45) Date of Patent: Dec. 17, 2013

(54) METHOD AND APPARATUS FOR PROVIDING MULTI-HOMING TO AN AGGREGATE ENDPOINT DEVICE

(75) Inventors: Steven A. Siegel, Mendham, NJ (US); Martin Dolly, Forked River, NJ (US); Leticia Johnson, Helotes, TX (US); Nancy Lambros, Spicewood, TX (US); Ricardo Sabat, Monroe Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 427 days.

(21) Appl. No.: 12/647,889

(22) Filed: Dec. 28, 2009

(65) Prior Publication Data
US 2011/0158230 A1    Jun. 30, 2011

(51) Int. Cl.
*H04L 12/56* (2011.01)
*H04Q 7/20* (2006.01)
*H04M 3/00* (2006.01)
*H04M 7/00* (2006.01)
*H04N 7/16* (2011.01)

(52) U.S. Cl.
USPC ... 370/389; 455/433; 455/435.1; 379/221.01; 379/269; 725/1

(58) Field of Classification Search
USPC .......................... 370/352, 389, 390
See application file for complete search history.

(56) References Cited

U.S. PATENT DOCUMENTS

| | | | |
|---|---|---|---|
| 2005/0009520 A1* | 1/2005 | Herrero et al. | 455/435.1 |
| 2006/0140384 A1* | 6/2006 | Plunkett et al. | 379/221.02 |
| 2007/0088836 A1* | 4/2007 | Tai et al. | 709/227 |
| 2008/0240408 A1* | 10/2008 | Nakai | 379/269 |
| 2009/0252157 A1* | 10/2009 | Van Elburg et al. | 370/352 |
| 2009/0319686 A1* | 12/2009 | Watanabe | 709/240 |
| 2010/0192170 A1* | 7/2010 | Raleigh | 725/1 |

* cited by examiner

*Primary Examiner* — Andrew Chriss
*Assistant Examiner* — Ajit Reddy

(57) ABSTRACT

A method and an apparatus for providing multi-homing to an aggregate endpoint device over a network are disclosed. In one embodiment, the method receives a session request directed towards a user endpoint device by a routing device. The method receives at least one Public User Identity (PUID) for the user endpoint device if the session request is for a subscriber of a service with multi-homing via an aggregate endpoint device. The method selects a route for sending the session request in accordance with the at least one PUID and a route priority information of the PUID associated with the user end point device, wherein the route with a highest priority is selected, and forwards the session request via the selected route.

20 Claims, 4 Drawing Sheets

US 8,611,344 B2

METHOD AND APPARATUS FOR PROVIDING MULTI-HOMING TO AN AGGREGATE ENDPOINT DEVICE

The present disclosure relates generally to communication networks and, more particularly, to a method and apparatus for providing multi-homing to an aggregate endpoint device over a network, e.g., an Internet Protocol (IP) network, a Voice over Internet Protocol (VoIP) network, and the like.

BACKGROUND

An enterprise customer may enable users (e.g., employees of the enterprise customer) to access communication services using a Private Branch Exchange (PBX). For example, the PBX can be used to enable the enterprise customer to subscribe to a limited number of connections to a circuit switched network, e.g., the Public Switched Telephone Network (PSTN). The limited number of connections can then be shared among a large number of employees. Prior to transitioning services from a traditional circuit switched network to the IMS network, many enterprise customers require a similar capability from the IMS network. However, unlike traditional circuit switched networks, Internet Protocol (IP) Multimedia Subsystem (IMS) networks have been initially designed for single user endpoint devices that access the IMS network through a single Proxy-Call Session Control Function (P-CSCF).

SUMMARY

In one embodiment, the present disclosure describes a method and an apparatus for providing multi-homing to an aggregate endpoint device over a network. In one embodiment, the method receives a session request directed towards a user endpoint device by a routing device. The method receives at least one Public User Identity (PUID) for the user endpoint device if the session request is for a subscriber of a service with multi-homing via an aggregate endpoint device. The method selects a route for sending the session request in accordance with the at least one PUID and a route priority information of the PUID associated with the user end point device, wherein the route with a highest priority is selected, and forwards the session request via the selected route.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for providing multi-homing to an aggregate endpoint device over a network. Although the present disclosure is discussed below in the context of IP networks, e.g., an Internet Protocol (IP) Multimedia Subsystem (IMS) network, the present disclosure is not so limited. Namely, the present disclosure can be applied to packet networks in general, e.g., Voice over Internet Protocol (VoIP) networks, Service over Internet Protocol (SoIP) networks, and the like.

Figure 1:
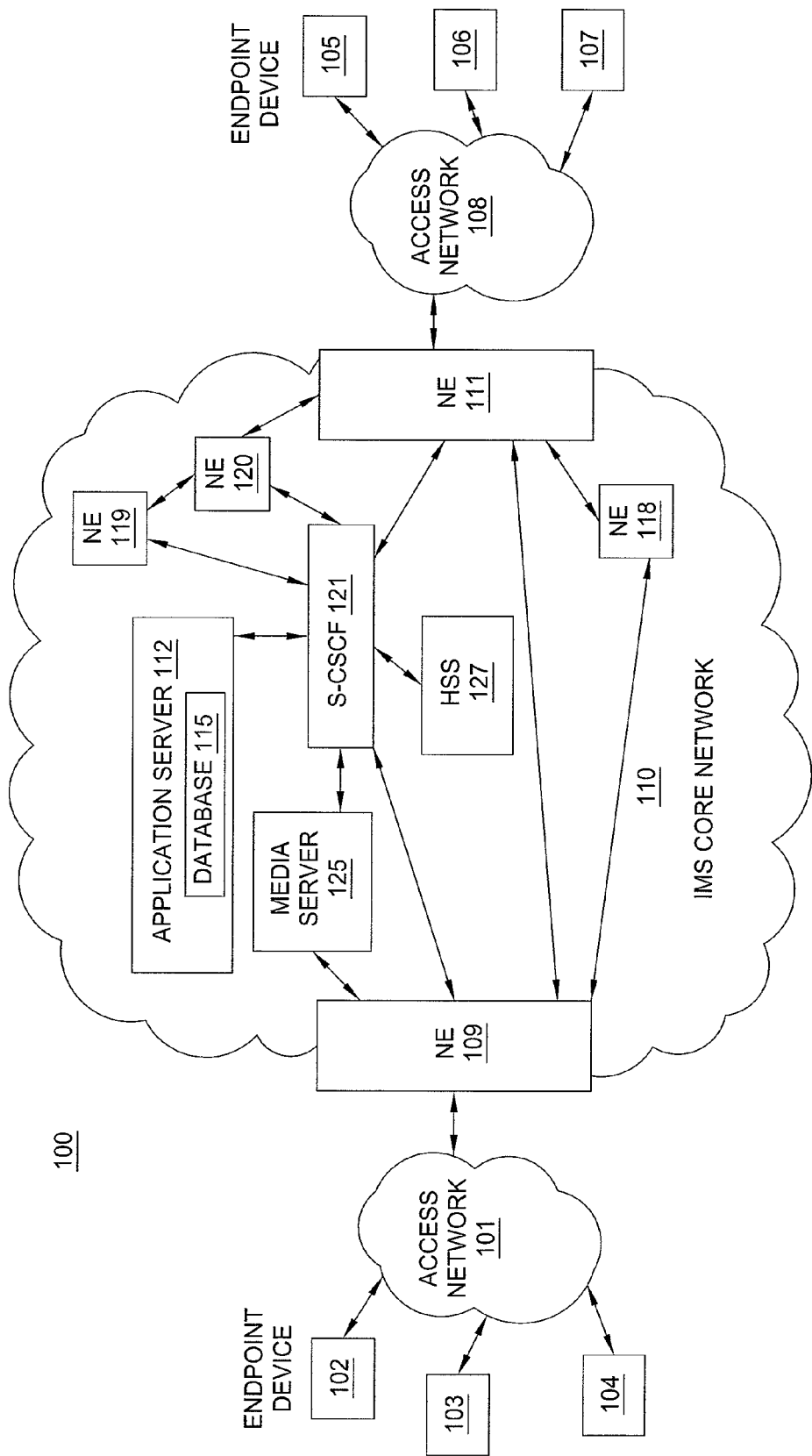
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet Protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, PBXs, aggregate endpoints (e.g., an aggregate endpoint that employs a SIP user agent to interact with the network on behalf of a plurality of endpoints aggregated behind it) and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network, a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. For a specific session, the S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112), when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an SIP URI, and so on. For example, the S-CSCF routes to a P-CSCF indicated by the SIP URI. The P-CSCF then routes to the SIP User Agent (UA) over a relationship that is established between the P-CSCF and the SIP UA which may represent an aggregate endpoint. This relationship could be a SIP trunk.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present disclosure.

The above IP network is only described to provide an illustrative environment in which packets for voice, data, and multimedia services are transmitted on IP Multimedia Subsystem (IMS) networks. In one embodiment, the IMS service provider may wish to enable customers to transition their services from a traditional circuit switched network accessed through an enterprise Private Branch Exchange (PBX) to the IMS network. However, most enterprise customers are accustomed to using an aggregate endpoint such as a PBX to utilize a small number of connections to the service provider's network to support a large number of users. For example, an enterprise customer may subscribe only to five external phone lines to support a larger number of employees, e.g., 10, 20, or 30 employees, who are sharing the five external phone lines. The sharing of external lines is facilitated using an aggregate endpoint such as a PBX. The enterprise customers may also require other PBX features such as multi-homing. The multi-homing capability can be used for load distribution, survivability, etc.

However, unlike traditional circuit switched networks, IMS networks are designed for single user endpoint devices that access the IMS network through a single Proxy-Call Session Control Function (P-CSCF). Prior to transitioning services from a traditional circuit switched network to the IMS network, an enterprise customer may require a similar or better capability from the IMS network.

In one embodiment, the current method provides multi-homing to an aggregate endpoint device. The aggregate endpoint device is a device that serves multiple user endpoint devices. In order to more clearly describe the current method and apparatus, the following networking terminologies are first provided.

E.164; and

ENUM (tElephone NUmbering Mapping).

E.164 refers to an ITU (International Telecommunications Union)-T recommendation which defines the international public telecommunication numbering plan for formatting telephone numbers such that they may be signaled across one or more networks. The E.164 format includes a country code and subsequent digits, but not the international prefix.

ENUM refers to a standard protocol defined by the Internet Engineering Task Force (IETF) for translating phone numbers that are in E.164 format to Internet domain names such that a Domain Name Server (DNS) may resolve the IP addresses for E.164 numbers the same way it resolves traditional website domains. For example, ENUM may be used to transform a phone, a fax or a pager number into a URI (Uniform Resource Identifier).

In order to translate a phone number to an Internet Domain name, the phone number is first provided in an E.164 format. Specifically, the phone number is first translated or converted to a full E.164 formatted number. For example, the original phone number may not have indicated a country code, area code, etc. However, an E.164 formatted phone number includes a country code, area code and the specific number within the area code. For example, "1" is the country code for all phone numbers in the United States of America (USA). If the original USA phone number is 987-555-1234, it is translated to an E.164 formatted number yielding 1-987-555-1234. The E.164 number is then reduced to digits only, e.g., 19875551234. The digits are then reordered back to front, e.g. 43215557891. Once the digits are reordered, dots are placed between each digit and the Internet domain e164.arpa is added to the end. For the above example, the resulting Internet domain is 4.3.2.1.5.5.5.7.8.9.1.e164.arpa.

In operation, an ENUM server may then be queried by the S-CSCF of the calling party to resolve on the domain name 4.3.2.1.5.5.5.7.8.9.1.e164.arpa. For example, an IP Multimedia Subsystem (IMS) network may use an ENUM server to resolve phone number that is in E.164 format, i.e., the contact information of the phone number. The S-CSCF of the calling party may then query a DNS for the regular routing of the contact information resided in the NAPTR (Naming Authority Pointer) resource records, e.g., the SIP URI. In sum, the S-CSCF of the calling party will send the ENUM query and the ENUM server will return the NAPTR resource records if the E.164 number is registered, wherein the S-CSCF then queries the DNS for the destination of the returned records, e.g., the SIP URI of the called party.

It should be noted that the customer may have a set of NAPTR resource records. For example, the customer may have a SIP address, a telephone number, a presence service number, an email address, etc. The query may then retrieve the set of NAPTR resource records for the customer.

If the S-CSCF of the calling party receives a successful response to the query (queries) sent to the ENUM and DNS, the S-CSCF then routes the call signaling to the Interrogating-Call Session Control Function (I-CSCF) of the returned domain for termination. That is, the S-CSCF routes the call signaling to the I-CSCF handling the destination of the returned record. The I-CSCF may then interrogate the HSS to determine the S-CSCF of the called party. If the HSS then returns a Serving-Call Session Control Function Fully Qualified Domain Name (S-CSCF FDQN) (broadly referred to as domain information) of the called party, the I-CSCF routes the incoming session request (SIP INVITE message) to the S-CSCF of the called party for completion.

In one embodiment, the current method provides multi-homing to an aggregate endpoint device via an S-CSCF of a called party, wherein the S-CSCF of the called party communicates with the aggregate endpoint device via a plurality of P-CSCFs. The multi-homing can be used for an originating session or terminating session. For example, the session may be initiated by a user endpoint device that utilizes the aggregate endpoint device or may be terminating at the user endpoint device that utilizes the aggregate endpoint device.

If the session is an originating session, the aggregate endpoint device can distribute the session across two or more P-CSCFs to provide multi-homing. For example, if there is a link failure between one of the P-CSCFs and the S-CSCF, the multi-homing capability can be used to enable the session request to reach the S-CSCF via an another P-CSCF that uses another link.

In one embodiment, if the session request is directed towards a user endpoint device that utilizes the aggregate endpoint device (terminating session), the current method enables the terminating S-CSCF to distribute sessions across a plurality of P-CSCFs using different Public User Identities (PUIDs) to identify a user (broadly a user or a user endpoint device currently associated with the user), as described below. It should be noted that PUID is also known as IM Public user identity (IMPU) under the 3rd Generation Partnership Project (3GPP).

First, the current method assigns a different PUID to each user endpoint device within the same service that represents the aggregate endpoint device. For example, as part of the same service profile (same aggregate endpoint device), the various users may get the same service from the IMS network. However, each user is able to receive different accesses through different P-CSCFs. Each user may provide his/her preference for access to the SIP registrar. For example, a user may choose to have a specific P-CSCF to be a primary P-CSCF. In another example, a user may allow the decision as to which P-CSCF is the primary to be decided by the network. Yet, in another example, a user may choose the preference to be based on network congestion, i.e., the primary P-CSCF will be selected based on network traffic condition and so on.

In one embodiment, the method provides and manages the PUIDs via an application server. Table-1 provides an illustrative registry, e.g., a SIP registry or registrar, that can be used for managing PUIDs. It should be noted that the SIP registry is internal to the S-CSCF in one embodiment. However, it should be noted that the present disclosure is not so limited. For example, the SIP registry can be implemented as an external device to the S-CSCF. For example, PUID1 and PUID2 refer to two different identities that are associated in the SIP Registry with different SIP User Agents that access services via the aggregate endpoint device. In this illustrative example, the SIP registry contains a priority field. For example, a priority value of "2" may signify a higher value when compared to a priority value of "1", and hence a route and the associated P-CSCF that are associated with the priority field of "2" can be considered to be the primary route and primary P-CSCF for the specific PUID. It should be noted that the service provider may implement different algorithms and designations to signify the customer preference. The current example is not intended to limit the current method to a specific implementation.

TABLE 1

| PUID | P-CSCF | User Access | Priority |
|------|--------|-------------|----------|
| PUID1 | P-CSCF A | AEP UA | 2 |
| PUID1 | P-CSCF B | AEP UA | 1 |
| PUID2 | P-CSCF B | AEP UA | 2 |
| PUID2 | P-CSCF A | AEP UA | 1 |

When a session request is received, the application server interacts with the S-CSCFs and supplies the appropriate PUID for a user. For example, a terminating S-CSCF may forward a session request to the application server. In turn, the application server may return the session request to the terminating S-CSCF, wherein the returned session request comprises the PUID for the destination user identity, e.g., PUID1 or PUID2. For multi-homing, both PUID1 and PUID 2 would be associated with the same SIP User Agent on the same Aggregate Endpoint device. In one embodiment, the application server places the PUID in the header of the session request. For example, for a SIP session request (e.g., a SIP Invite request), the application server may provide the PUID in the P-Served-User Header.

In one embodiment, the terminating S-CSCF can then distribute the session requests in accordance with the PUID. For example, the S-CSCF can forward the session request towards the aggregate endpoint device via the primary P-CSCF associated with the specific PUID. For the example above, if the PUID is PUID1, the S-CSCF first sends the session request via P-CSCF A, in accordance with the P-CSCF selection by the user which in this case assigns a priority of 2 to the route via P-CSCF A. If the session request is successful, then the calling and called parties can then transmit and receive packets. If the request sent via the primary P-CSCF (i.e., P-CSCF A) fails, then the S-CSCF can then send the session request via a secondary P-CSCF (i.e., P-CSCF B), which is assigned a priority of 1. In this manner, multi-homing is provided to an aggregate endpoint device over an IMS network.

Figure 2:
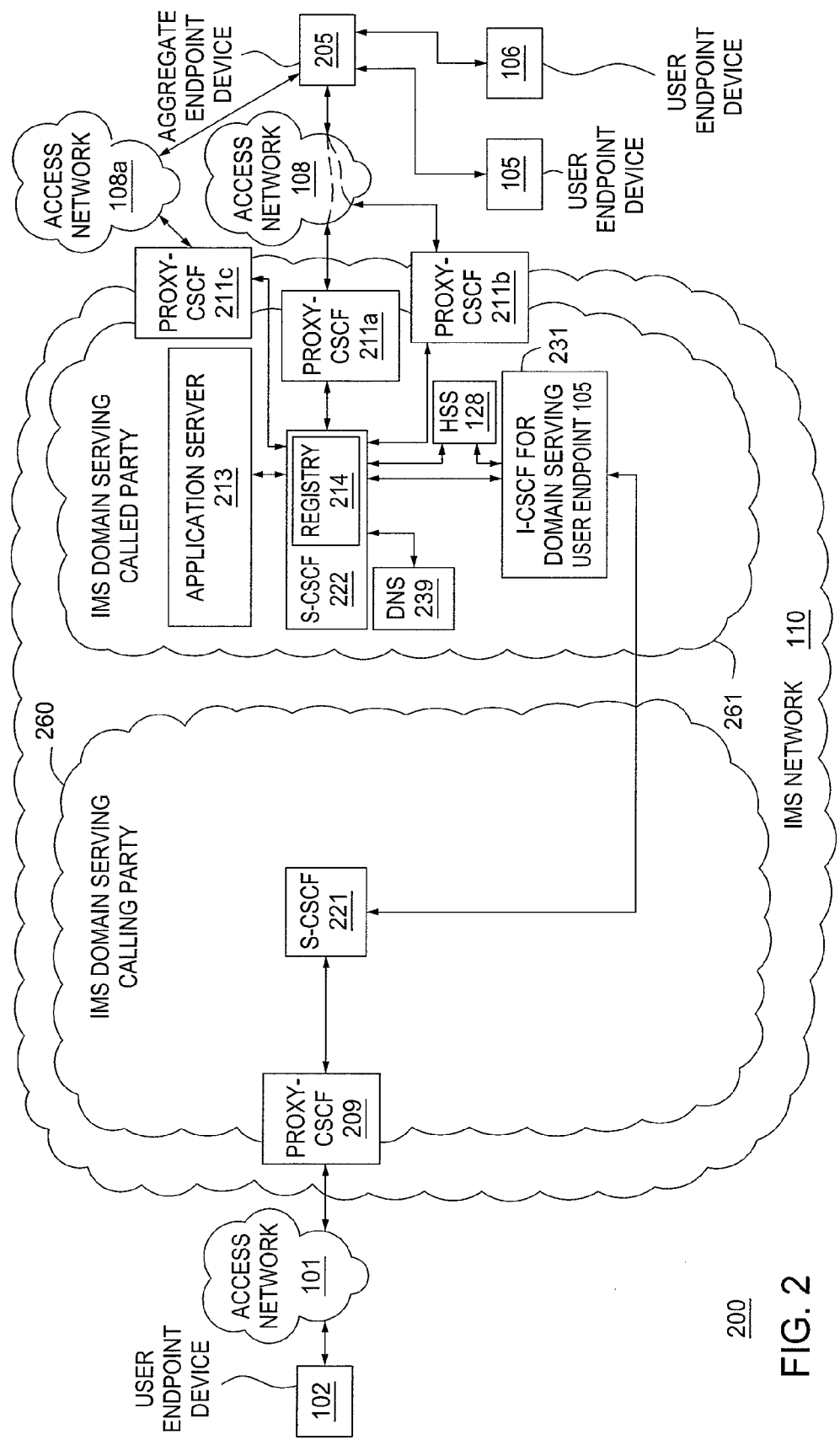
FIG. 2 illustrates an exemplary network in accordance with one embodiment of the current disclosure for providing multi-homing to an aggregate endpoint device over a network.

FIG. 2 illustrates an exemplary network 200 in accordance with one embodiment of the current disclosure for providing multi-homing to an aggregate endpoint device over a network. In one embodiment, the network 200 comprises User Endpoint (UE) device 102 communicating with an IMS network 110 via access network 101, and UE devices 105 and 106 communicating with the IMS network 110 via access network 108. The UE devices 105 and 106 reach the access network 108 via an aggregate endpoint device 205. The aggregate endpoint device 205 comprises a multi-user endpoint device that support a plurality of user endpoint devices.

For illustration, the IMS network 110 comprises domains 260 and 261. It should be noted that the IMS network 110 may comprise any number of domains. In one embodiment, the IMS domain 260 comprises a P-CSCF 209, and a S-CSCF 221. Although the IMS domain 260 may comprise other network elements, these network elements are not disclosed in this disclosure for clarity reasons. The IMS domain 261 comprises P-CSCF 211a, a HSS 128, P-CSCF 211b, a S-CSCF 222, a DNS 239, an application server 213 and an I-CSCF 231, interconnected for providing services to the plurality of customers. For example, the domain 260 and domain 261 may support various services (e.g., VoIP service, streaming video services, television services, cellular services, etc.). In another embodiment, Aggregate Endpoint 205 may also be connected to IMS Domain 261 through a second Access Network with different Proxy CSCFs.

It should be noted that the IMS domains 260 and 261 may employ similar network components and may have various other components that are not shown. The present disclosure includes only the components that are needed to describe the current method and apparatus with simplicity. In one example, the customer with UE 102 is served by the domain 260 and the customer with UE 105 is served by the domain 261.

In one embodiment, the current method provides multi-homing to an aggregate endpoint device 205 via an S-CSCF 222, wherein the S-CSCF 222 of the called party communicates with the aggregate endpoint device 205 via a plurality of P-CSCFs 211a and 211b. The method also provides and manages PUIDs via the application server 213. For example, the application server may change a PUID in an existing header or may add a new header with a PUID.

In one example, the aggregate endpoint device 205 receives an originating session request from UE 105. The aggregate endpoint device 205 then distributes the originating session across the P-CSCFs 211a or 211b to support a multi-homing capability. In a different embodiment, the choice of P-CSCFs (e.g., 211c) could result in the use of a different Access Network (e.g., 108a).

In another example, UE 102 initiates a session towards UE 105 (e.g., sending a SIP INVITE message). The S-CSCF 221 receives the session request via P-CSCF 209. The S-CSCF 221 may then route the call signaling to the I-CSCF 231 via a border element (not shown). It should be noted that for clarity reasons, many components of the calling party domain are not disclosed or discussed in this disclosure. The I-CSCF 231 then receives and processes the session request. Specifically, the I-CSCF 231 receives the session request and interrogates the HSS 128 to determine the S-CSCF of the called party. The I-CSCF 231 receives the S-CSCF FDQN from the HSS 128, and then routes the session request to the S-CSCF 222 (the S-CSCF of the called party), for completion in accordance with the received S-CSCF FDQN. It should be noted that the call as illustrated in FIG. 2 as originating from the calling party domain 260 is only illustrative. For example, the call may originate from other domains, e.g., another IMS domain, or the PSTN (broadly a non-IMS domain) and so on.

In one embodiment, the S-CSCF 222 then forwards the session request to the application server 213 to obtain the PUID for the called party. It should be noted that the session request already has a PUID (e.g., the dialed number of the called party, and the like). When a session request is received, the application server 213 interacts with S-CSCF 222 and supplies the appropriate PUID for the particular user. For example, the S-CSCF 222 may forward a session request to the application server 213. In turn, the application server 213 returns the session request to the terminating S-CSCF 222, wherein the returned session request comprises the PUID of an aggregate endpoint for the destination user endpoint device, e.g., PUID1 or PUID2. For example, the application server 213 places the PUID in the header of the returned session request. For example, the application server 213 may insert the PUID in the P-Served-User Header of a SIP response.

The terminating S-CSCF 222 may then distribute the session request in accordance with the specific PUID received from the application server 213. For example, the S-CSCF 222 can forward the session request towards the aggregate endpoint device 205 via the primary P-CSCF (211a or 211b) for the specific PUID. If the request sent via the primary P-CSCF fails, then the S-CSCF 222 can send the session request via the secondary P-CSCF.

In one embodiment, the current method provides at least one PUID for each separate P-CSCF. For example, if the aggregate endpoint device is communicating with the S-CSCF via two different P-CSCFs, the method provides at least one PUID for each of the two different P-CSCFs.

It should be noted that although the above disclosure illustrates that the session requests originated from another S-CSCF, the session requests may in fact originate from other sources. For example, if a device on a circuit switched network dialed an aggregate endpoint on the IMS, then the session request will come into the IMS through a circuit switched gateway. It would go from the circuit switched gateway to the I-CSCF. Other calls may come from a SIP interconnection with another network whether or not the other network had an S-CSCF. These session requests would also go to an I-CSCF.

Figure 3:
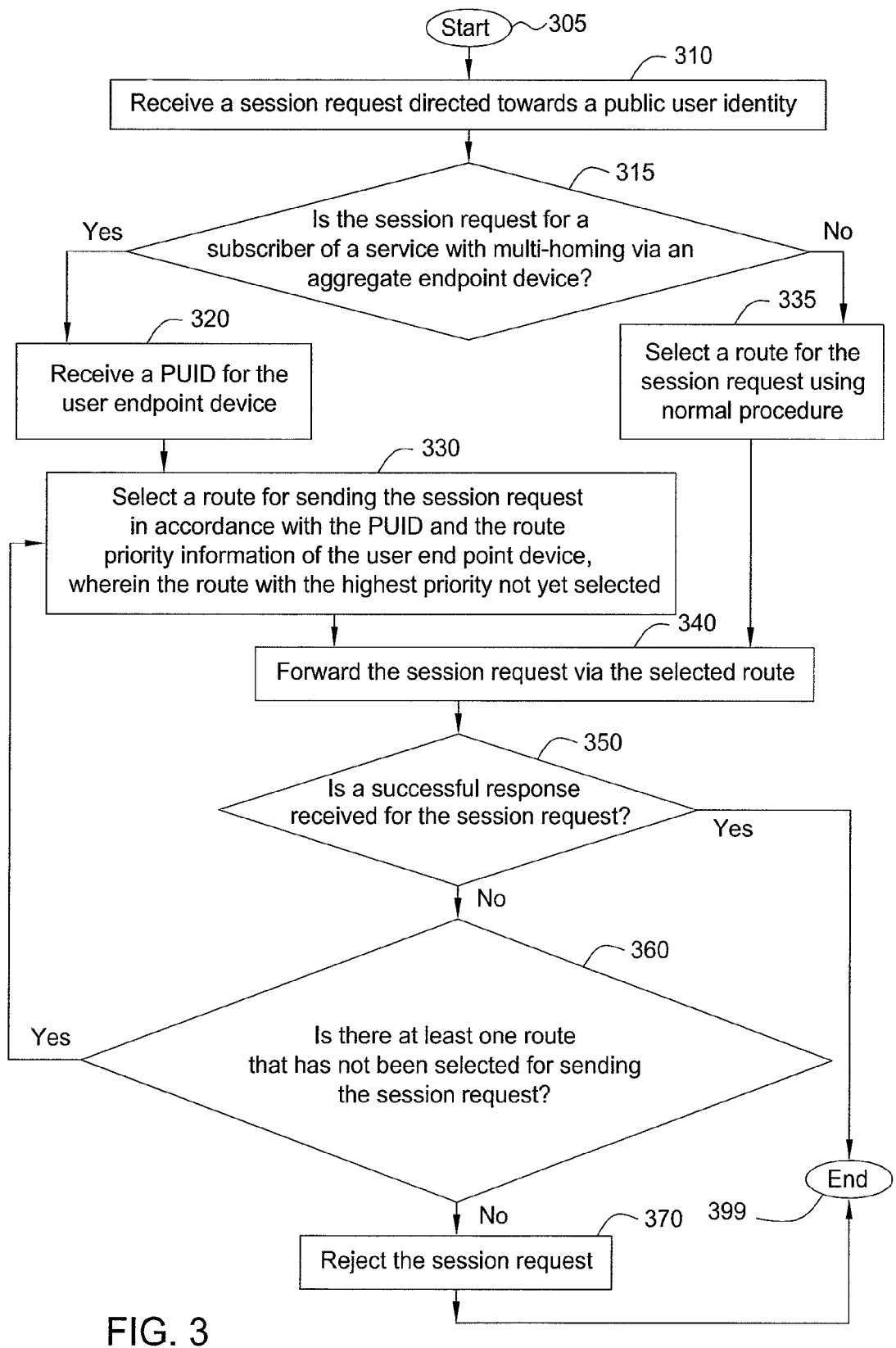
FIG. 3 illustrates a flowchart of a method for providing multi-homing to an aggregate endpoint device over a network.

FIG. 3 illustrates a flowchart of a method 300 for a routing device providing multi-homing to an aggregate endpoint device in a network. In one embodiment, the routing device for providing multi-homing to an aggregate endpoint device comprises an S-CSCF. Method 300 starts in step 305 and proceeds to step 310.

In step 310, method 300 receives a session request directed towards a public user identity. For example, an S-CSCF may receive a SIP INVITE message for terminating at a user endpoint device of a subscriber of a VoIP service. Note that the called party is the subscriber of the VoIP service.

In step 315, method 300 determines if the session request is for a subscriber of a service with multi-homing via an aggregate endpoint device. If the session request is for a subscriber of a service with multi-homing via an aggregate endpoint device, the method proceeds to step 320. Otherwise, the method proceeds to step 335.

In step 320, method 300 receives a PUID for the user endpoint device. For example, the S-CSCF 222 forwards a session request to an application server that provides and/or manages the PUIDs for the multi-homing service. Specifically, the application server retrieves the PUID associated with an aggregate endpoint for the user endpoint device and forwards the PUID in the returned session request to the S-CSCF. In one embodiment, the session request is forwarded to the application server and the application server returns the session request with the PUID. The returned session request comprises the PUID of an aggregate endpoint for the destination user endpoint device. In one embodiment, the PUID is provided in the header of the session request. It should be noted that the application server provides the PUID in accordance with a selection method that may comprise a round robin approach. Alternatively, the application server may provide the PUID in accordance with a selection method that may comprise a congestion based approach, i.e., a particular PUID is selected to minimize congestion in the network and so on.

In step 330, method 300 selects a route for sending the session request in accordance with the PUID and the route priority information of the user end point device, wherein the route with the highest priority not yet selected is selected. For example, the customer may have provided a preference for primary, secondary, etc. routes in a SIP registry. The S-CSCF can then use the PUID to identify which user is being served via the aggregate endpoint device. Once the user is identified via the PUID, the S-CSCF can retrieve the preference information from the SIP registrar. The method then proceeds to step 340.

In step 335, method 300 selects a route for the session request using normal procedure. For example, there may be a P-CSCF address or UE address provided during the registration process.

In step 340, method 300 forwards the session request via the selected route. For example, the S-CSCF forwards the session request towards the aggregate endpoint device via the primary P-CSCF for the specific PUID. In another example, the user may not be a subscriber of a service that comprises a multi-homing feature and the session request may be forwarded via a route selected using normal procedures.

In step 350, method 300 determines if a successful response is received for the session request. For example, the S-CSCF may determine if a SIP acknowledgement is received. If a successful response is received, the method proceeds to step 399 to end processing the current session request. Otherwise, the method proceeds to step 360.

In step 360, method 300 determines if there is at least one route that has not been selected for sending the session request. For example, if the user subscribes to multi-homing, then there may be a secondary route via another P-CSCF that can be used to reach the aggregate endpoint device. In other words, there may be a secondary route using another physical trunk. If there is at least one more route that has not been selected for sending the session request, then the method proceeds to step 330 to select another route. Otherwise, the method proceeds to step 370.

In step 370, method 300 rejects the session request. For example, the method provides a response to the session request with a rejection. The method then proceeds to step 399 to end processing the current session request.

It should be noted that the above terminating S-CSCF may query various application servers prior to forwarding the session request towards its destination via a selected route. In other words, various application servers that are used in regular call handling procedures are omitted from the above description for clarity. Hence, the method of the current disclosure may be used to provide multi-homing to aggregate endpoint devices in conjunction with any other services provided to the customer via other application servers, or like devices.

It should be noted that the various control functions, e.g., S-CSCF, P-CSCF, and I-CSCF are broadly described as functions. As such, these various control functions can be deployed in any number of network elements, e.g., a routing device, a router, a switch, a border element, a gateway, an application server and the like.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
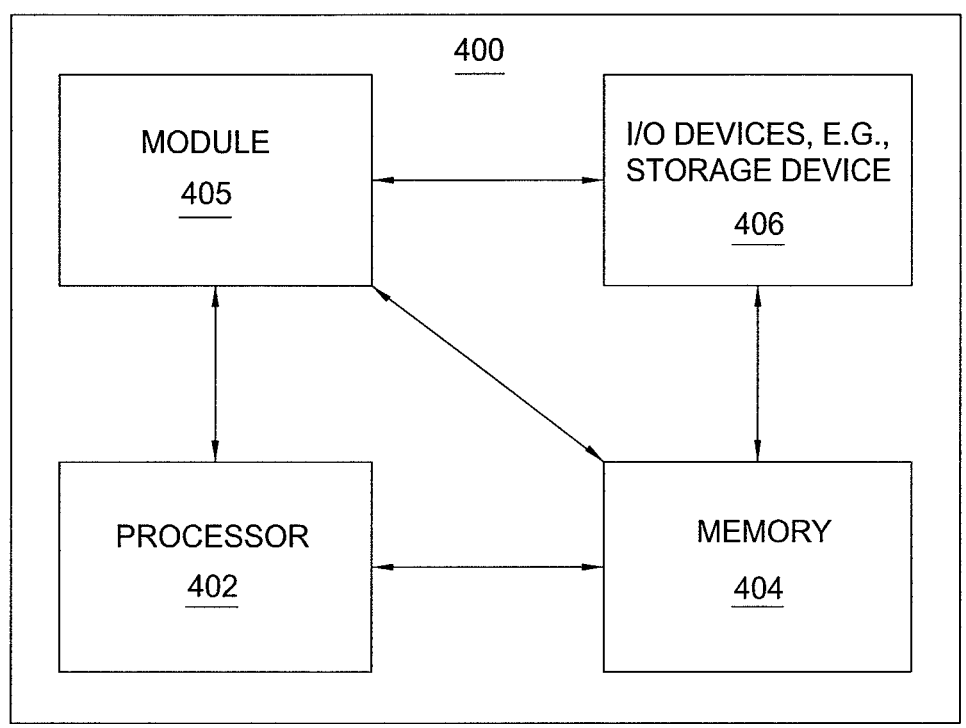
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing multi-homing to an aggregate endpoint device over a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for providing multi-homing to an aggregate endpoint device over a network can be loaded into memory 404 and executed by processor 402 to implement the functions as discussed above. As such, the present method 405 for providing multi-homing to an aggregate endpoint device over a network (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing multi-homing to an aggregate endpoint device over a network, the aggregate endpoint device being a multi-user endpoint device that supports a plurality of user endpoint devices, the method, comprising:
    receiving by a routing device a session request directed towards one user endpoint device of the plurality of user endpoint devices;
    receiving a public user identity for the one user endpoint device when the session request is for a subscriber of a service with multi-homing via the aggregate endpoint device, wherein the service with multi-homing comprises providing a plurality of network links;
    selecting a route for sending the session request in accordance with the public user identity and route priority information that is stored for the public user identity associated with the one user endpoint device, wherein the route that is selected has a highest priority among a plurality of priority values that have not yet been selected based on the route priority information; and
    forwarding the session request via the route that is selected.

2. The method of claim 1, further comprising:
    determining whether a successful response is received for the session request being forwarded via the route that is selected; and
    selecting another route with a next lower priority based on the route priority information when the successful response is not received.

3. The method of claim 1, wherein the routing device comprises a serving-call session control function.

4. The method of claim 1, wherein the public user identity is associated with a proxy-call session control function.

5. The method of claim 1, wherein the session request comprises an invite message to a called party from a calling party.

6. The method of claim 5, wherein the invite message is in accordance with a session initiation protocol.

7. The method of claim 1, wherein the route priority information of the one user end point device is determined by the subscriber.

8. A non-transitory computer-readable storage medium storing a plurality of instructions which, when executed by a processor of a routing device, cause the processor to perform operations for providing multi-homing to an aggregate endpoint device over a network, the aggregate endpoint device being a multi-user endpoint device that supports a plurality of user endpoint devices, the operations comprising:
    receiving by the routing device a session request directed towards one user endpoint device of the plurality of user endpoint devices;
    receiving a public user identity for the one user endpoint device when the session request is for a subscriber of a service with multi-homing via the aggregate endpoint device, wherein the service with multi-homing comprises providing a plurality of network links;
    selecting a route for sending the session request in accordance with the public user identity and route priority information that is stored for the public user identity associated with the one user endpoint device, wherein the route that is selected has a highest priority among a plurality of priority values that have not yet been selected based on the route priority information; and forwarding the session request via the route that is selected.

9. The non-transitory computer-readable storage medium of claim 8, further comprising:

determining whether a successful response is received for the session request being forwarded via the route that is selected; and selecting another route with a next lower priority based on the route priority information when the successful response is not received.

10. The non-transitory computer-readable storage medium of claim 8, wherein the routing device comprises a serving-call session control function.

11. The non-transitory computer-readable storage medium of claim 8, wherein the public user identity is associated with a proxy-call session control function.

12. The non-transitory computer-readable storage medium of claim 8, wherein the session request comprises an invite message to a called party from a calling party.

13. The non-transitory computer-readable storage medium of claim 12, wherein the invite message is in accordance with a session initiation protocol.

14. The non-transitory computer-readable storage medium of claim 8, wherein the route priority information of the one user end point device is determined by the subscriber.

15. An apparatus for providing multi-homing to an aggregate endpoint device over a network, the aggregate endpoint device being a multi-user endpoint device that supports a plurality of user endpoint devices, comprising:

a processor; and a computer readable medium storing a plurality of instructions that, when executed by the processor, cause the processor to perform operations, the operations comprising:

receiving a session request directed towards one user endpoint device of the plurality of user endpoint devices;

receiving a public user identity for the one user endpoint device when the session request is for a subscriber of a service with multi-homing via the aggregate endpoint device, wherein the service with multi-homing comprises providing a plurality of network links;

selecting a route for sending the session request in accordance with the public user identity and route priority information that is stored for the public user identity associated with the one user endpoint device, wherein the route that is selected has a highest priority among a plurality of priority values that have not yet been selected based on the route priority information; and forwarding the session request via the route that is selected.

16. The apparatus of claim 15, wherein the operations further comprise:

determining whether a successful response is received for the session request being forwarded via the route that is selected; and selecting another route with a next lower priority based on the route priority information when the successful response is not received.

17. The apparatus of claim 15, wherein the apparatus comprises a serving-call session control function.

18. The apparatus of claim 15, wherein the public user identity is associated with a proxy-call session control function.

19. The apparatus of claim 15, wherein the session request comprises an invite message to a called party from a calling party.

20. The apparatus of claim 15, wherein the invite message is in accordance with a session initiation protocol.

* * * * *